(12) United States Patent
Rolion

(10) Patent No.: US 9,857,891 B2
(45) Date of Patent: *Jan. 2, 2018

(54) MANUAL DEVICE ADAPTED FOR A CAPACITIVE SCREEN

(71) Applicant: SOCIETE BIC, Clichy (FR)

(72) Inventor: Franck Rolion, Asnieres sur Oise (FR)

(73) Assignee: SOCIETE BIC, Clichy (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/889,011

(22) PCT Filed: Apr. 22, 2014

(86) PCT No.: PCT/FR2014/050971
§ 371 (c)(1),
(2) Date: Nov. 4, 2015

(87) PCT Pub. No.: WO2014/181053
PCT Pub. Date: Nov. 13, 2014

(65) Prior Publication Data
US 2016/0077612 A1    Mar. 17, 2016

(30) Foreign Application Priority Data

May 6, 2013   (FR) ..................... 13 54146

(51) Int. Cl.
*G06F 3/0354* (2013.01)
*B43K 29/00* (2006.01)
*G06F 3/044* (2006.01)

(52) U.S. Cl.
CPC .......... *G06F 3/03545* (2013.01); *B43K 29/00* (2013.01); *G06F 3/044* (2013.01); *G06F 2203/04102* (2013.01)

(58) Field of Classification Search
CPC ...... G06F 3/03545; G06F 3/044; B43K 29/00
See application file for complete search history.

(56) References Cited

U.S. PATENT DOCUMENTS

| | | | |
|---|---|---|---|
| 4,289,927 A | 9/1981 | Rodgers | |
| 5,488,204 A | 1/1996 | Mead et al. | |
| 5,828,011 A | 10/1998 | Partow et al. | |
| 5,864,098 A | 1/1999 | Shinohe | |

(Continued)

FOREIGN PATENT DOCUMENTS

| CN | 101339470 A | 1/2009 |
|---|---|---|
| CN | 102023723 A | 4/2011 |

(Continued)

OTHER PUBLICATIONS

Oberg et al., Machinery's Handbook 26th Edition, 2000. p. 568.*

(Continued)

*Primary Examiner* — Liliana Cerullo
(74) *Attorney, Agent, or Firm* — Ohlandt, Greeley, Ruggiero & Perle, L.L.P.

(57) ABSTRACT

A manual device comprising a longitudinal prehension body and a pad for a capacitive screen mounted on one end of said body, wherein the body is insulating, while the pad is conductive, and a rod of polymer material filled with at least one conductive material and/or comprising a conductive coating is electrically in contact with the pad and extends longitudinally inside the body.

14 Claims, 3 Drawing Sheets

(56) References Cited

U.S. PATENT DOCUMENTS

| | | |
|---|---|---|
| 5,999,170 A | 12/1999 | Oura et al. |
| 6,707,451 B1 | 3/2004 | Nagaoka |
| 7,077,594 B1 | 7/2006 | Annerino et al. |
| 7,612,767 B1 | 11/2009 | Griffin et al. |
| 2003/0034962 A1 | 2/2003 | Huang et al. |
| 2003/0076310 A1 | 4/2003 | Kanzaki et al. |
| 2003/0122795 A1 | 7/2003 | Fujitsuka et al. |
| 2003/0128193 A1 | 7/2003 | Huang et al. |
| 2003/0132923 A1 | 7/2003 | Hu |
| 2003/0197691 A1 | 10/2003 | Fujiwara et al. |
| 2004/0201577 A1 | 10/2004 | Yamada |
| 2005/0078096 A1 | 4/2005 | Fan |
| 2005/0190161 A1 | 9/2005 | Hong et al. |
| 2005/0248549 A1 | 11/2005 | Dietz et al. |
| 2006/0239761 A1 | 10/2006 | Cetera |
| 2008/0043001 A1 | 2/2008 | Perkins et al. |
| 2008/0266267 A1 | 10/2008 | Chang |
| 2009/0008162 A1 | 1/2009 | Yang et al. |
| 2009/0050377 A1 | 2/2009 | Lee |
| 2009/0076770 A1 | 3/2009 | Fukushima et al. |
| 2009/0122029 A1 | 5/2009 | Sin |
| 2009/0146975 A1 | 6/2009 | Chang |
| 2009/0211821 A1 | 8/2009 | Yeh et al. |
| 2009/0251442 A1 | 10/2009 | Nakata |
| 2009/0266626 A1 | 10/2009 | Robb et al. |
| 2010/0006350 A1 | 1/2010 | Elias |
| 2010/0051356 A1 | 3/2010 | Stern et al. |
| 2010/0053120 A1 | 3/2010 | Chang et al. |
| 2010/0066693 A1 | 3/2010 | Sato et al. |
| 2010/0084203 A1 | 4/2010 | Peng |
| 2010/0214251 A1 | 8/2010 | Wu |
| 2010/0214252 A1 | 8/2010 | Wu |
| 2010/0315384 A1 | 12/2010 | Hargreaves et al. |
| 2011/0007037 A1 | 1/2011 | Ogawa |
| 2011/0069036 A1 | 3/2011 | Anno |
| 2011/0074741 A1 | 3/2011 | Liang et al. |
| 2011/0094804 A1 | 4/2011 | Liang |
| 2011/0175854 A1 | 7/2011 | Lien et al. |
| 2011/0304577 A1 | 12/2011 | Brown et al. |
| 2011/0316815 A1 | 12/2011 | Fang |
| 2012/0075258 A1 | 3/2012 | Leung |
| 2012/0268428 A1* | 10/2012 | Nakata .................... G06F 3/044 345/179 |
| 2013/0106771 A1 | 5/2013 | Bakken et al. |
| 2014/0125627 A1* | 5/2014 | Hiramoto ................ G06F 3/041 345/174 |

FOREIGN PATENT DOCUMENTS

| | | |
|---|---|---|
| CN | 102346579 A | 2/2012 |
| CN | 202383646 U | 8/2012 |
| CN | 203595998 U | 5/2014 |
| DE | 203 12 529 U1 | 3/2004 |
| DE | 20 2008 011 276 U1 | 1/2009 |
| DE | 20 2011 104 019 U1 | 12/2011 |
| DE | 20 2012 005 460 U1 | 10/2013 |
| EP | 0 716 391 A1 | 6/1996 |
| EP | 0 747 852 A2 | 12/1996 |
| EP | 1 215 622 A2 | 6/2002 |
| EP | 1 291 200 A1 | 3/2003 |
| EP | 1 643 351 A2 | 8/2005 |
| EP | 2 128 743 A1 | 9/2008 |
| EP | 1 995 658 A1 | 11/2008 |
| EP | 2 037 350 A2 | 3/2009 |
| EP | 2 077 488 A1 | 7/2009 |
| EP | 2 077 489 A1 | 7/2009 |
| EP | 2 159 669 A2 | 3/2010 |
| EP | 2 172 834 A2 | 4/2010 |
| EP | 2 219 104 A2 | 8/2010 |
| EP | 2 221 709 A2 | 8/2010 |
| EP | 2 339 432 A2 | 6/2011 |
| EP | 2 343 629 A2 | 7/2011 |
| EP | 2 466 424 A1 | 6/2012 |
| EP | 2 515 207 A1 | 10/2012 |
| EP | 2 703 960 A2 | 3/2014 |
| EP | 2 741 187 A2 | 6/2014 |
| FR | 2 483 100 A1 | 11/1981 |
| FR | 2 886 883 A1 | 12/2006 |
| FR | 3 005 287 A1 | 11/2014 |
| FR | 3 005 288 A1 | 11/2014 |
| FR | 3 012 632 A1 | 5/2015 |
| JP | 10-31543 H | 2/1998 |
| JP | 2002-236540 A | 8/2002 |
| JP | 2012-123744 A | 6/2012 |
| JP | 2012-138064 A | 7/2012 |
| JP | 2012-138065 A | 7/2012 |
| JP | 2012-138066 A | 7/2012 |
| JP | 3177874 U | 8/2012 |
| JP | 2013-125415 A | 6/2013 |
| JP | 2013-206053 A | 10/2013 |
| JP | 2014-81793 A | 5/2014 |
| KR | 10-1029436 B1 | 4/2011 |
| KR | 10-1047589 | 7/2011 |
| KR | 10-1056757 | 8/2011 |
| WO | 97/40488 A1 | 10/1997 |
| WO | 99/56970 A1 | 11/1999 |
| WO | 02/43045 A1 | 5/2002 |
| WO | 02/077962 A1 | 10/2002 |
| WO | 03/102913 A1 | 12/2003 |
| WO | 2004/110781 A2 | 12/2004 |
| WO | 2005/024775 A1 | 3/2005 |
| WO | 2005/029246 A2 | 3/2005 |
| WO | 2005/032846 A2 | 4/2005 |
| WO | 2008/058047 A1 | 5/2008 |
| WO | 2008/079714 A1 | 7/2008 |
| WO | 2009/031758 A1 | 3/2009 |
| WO | 2009/124602 A2 | 10/2009 |
| WO | 2009/143046 A2 | 11/2009 |
| WO | 2010/066145 A1 | 6/2010 |
| WO | 2010/079895 A2 | 7/2010 |
| WO | 2010/079896 A2 | 7/2010 |
| WO | 2010/105466 A1 | 9/2010 |
| WO | 2011/093570 A2 | 8/2011 |
| WO | 2011/132822 A1 | 10/2011 |
| WO | 2012/027401 A2 | 3/2012 |
| WO | 2012/094239 A1 | 7/2012 |
| WO | 2012/103241 A1 | 8/2012 |
| WO | 2012/103323 A1 | 8/2012 |
| WO | 2012/124280 A1 | 9/2012 |
| WO | 2012/145226 A2 | 10/2012 |
| WO | 2013/057862 A1 | 4/2013 |
| WO | 2013-082761 A1 | 6/2013 |
| WO | 2013-091182 A1 | 6/2013 |
| WO | 2013-128990 A1 | 9/2013 |
| WO | 2013/141999 A1 | 9/2013 |
| WO | 2013/158944 A2 | 10/2013 |
| WO | 2013/178316 A2 | 12/2013 |
| WO | 2013/178317 A2 | 12/2013 |
| WO | 2014/032282 A1 | 3/2014 |
| WO | 2014/180529 A1 | 11/2014 |
| WO | 2014/180530 A1 | 11/2014 |
| WO | 2015/013533 A2 | 1/2015 |
| WO | 2015/019883 A1 | 2/2015 |

OTHER PUBLICATIONS

International Search Report dated Jul. 21, 2014 from PCT/US2014/050971, 7 pages.

Chinese First Office Action dated Jul. 27, 2016 from corresponding Chinese Patent Application No. 2014800257324, 15 pages.

* cited by examiner

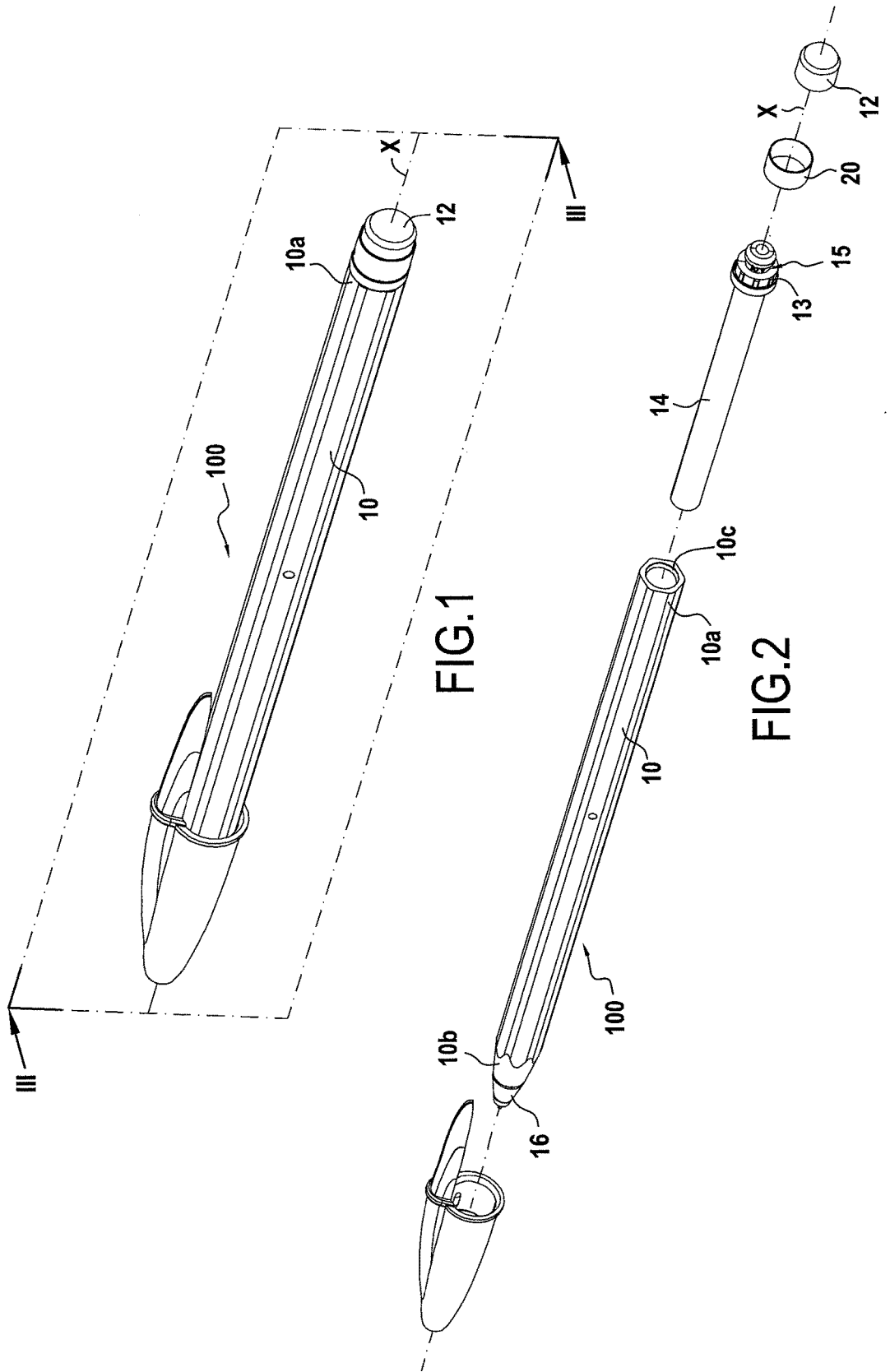

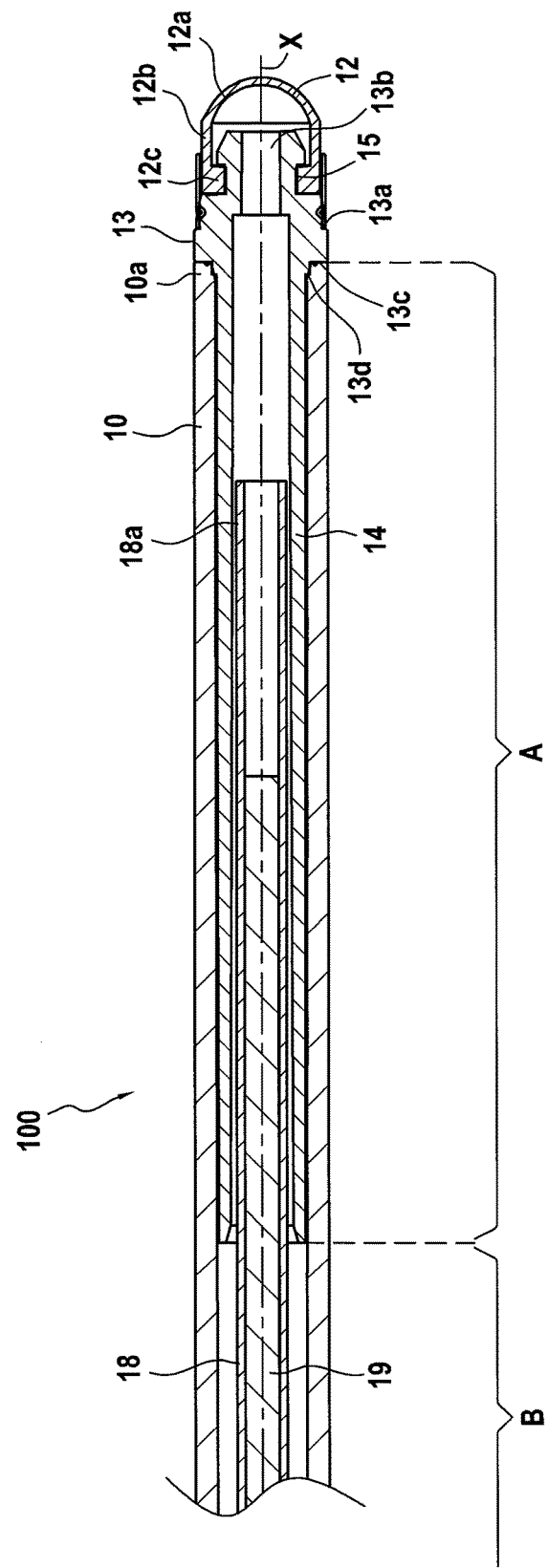

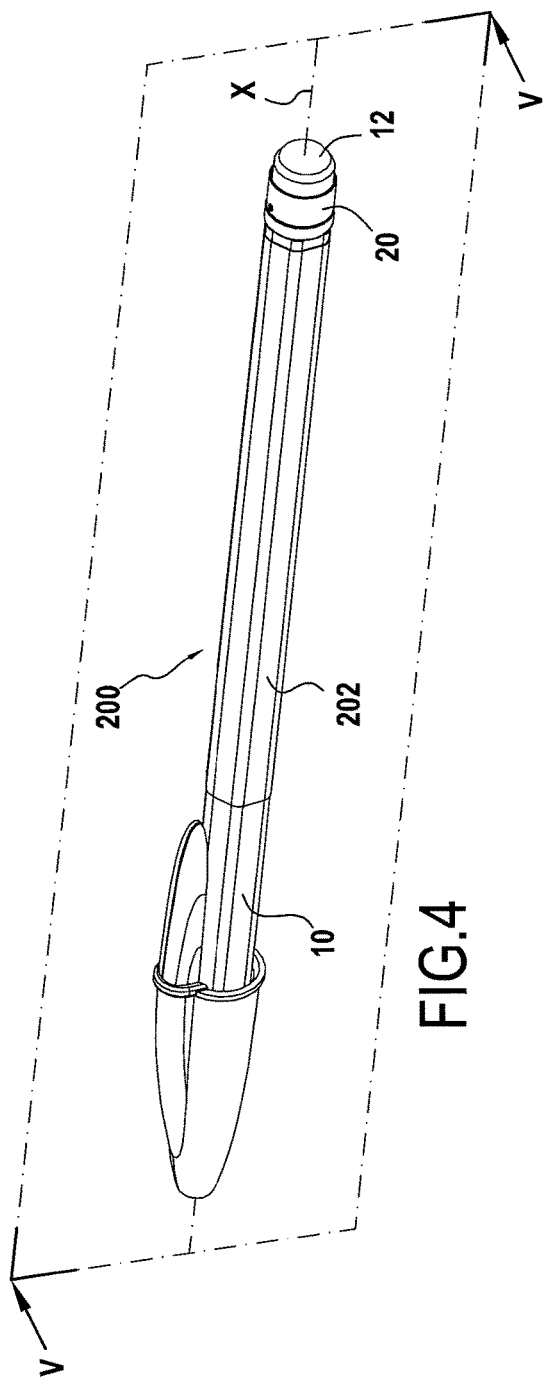
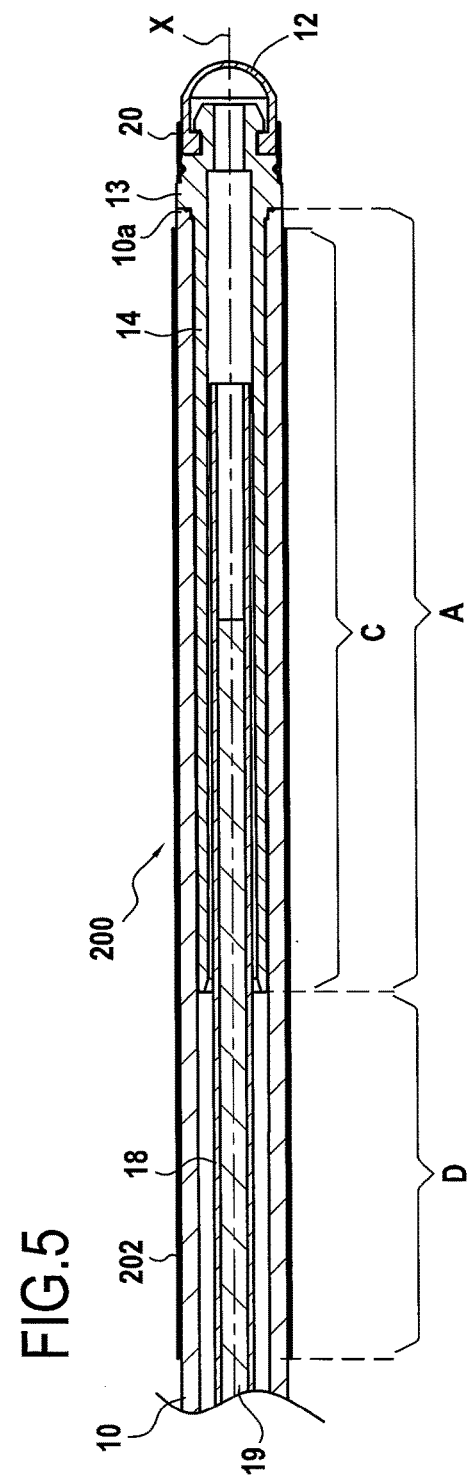
FIG.4
FIG.5

MANUAL DEVICE ADAPTED FOR A CAPACITIVE SCREEN

FIELD OF THE INVENTION

The invention relates to a manual device enabling a capacitive screen to be used, such as for example a graphics tablet. Such a device is capable of interfering/interacting with the capacitive screen in such a manner that its presence at a given point of said capacitive screen can be detected by the screen.

STATE OF THE PRIOR ART

Manual devices are known that comprise a longitudinal prehension body and a pad for a capacitive screen mounted at one end of said body. In those conventional devices, the prehension body must necessarily be electrically conductive and it must be electrically in contact with the pad, in order to ensure that, in use, the user's hand is electrically in contact with the pad via the body so as to enable the device to interact with a capacitive screen. This implies design, manufacturing, and expense constraints.

SUMMARY OF THE INVENTION

The object of the present invention is to remedy the above-mentioned drawbacks, at least substantially.

The invention achieves this object by proposing a manual device comprising a longitudinal prehension body (referred to below as "the body") and a pad for a capacitive screen referred to below as "the pad") mounted on one end of said body, wherein the body is insulating, while the pad is conductive, a rod of polymer material filled with at least one conductive material and/or comprising a conductive coating being electrically in contact with the pad and extending longitudinally inside the body.

By way of example, the manual device forms a stylus for a capacitive screen, a pen having a conventional writing tip and a tip for a capacitive screen, or more generally any manual instrument having a tip at one of its ends that is configured to interact with a capacitive screen.

It can be understood that the manual device is of the passive type. It should be recalled that an instrument that is said to be "passive" is an instrument that does not need to be powered by a source of energy in order to operate. Conversely, an instrument that is said to be "active" needs an energy source in order to operate, e.g. an internal electric battery. In other words, the manual device does not have any source of energy, and in particular any source of electrical energy, interacting with the pad.

Below, and unless specified to the contrary, the term "conductive" should be understood as "capable of conducting electricity". Conversely, below, and unless specified to the contrary, the term "insulating" should be understood as "insulating relative to electricity".

It can be understood that the pad is a termination configured to interact with a capacitive screen. The pad is conductive (because of the material from which it is made, or because of a coating). The shape, the flexibility/stiffness, and the material(s) of a pad are not limited, providing the pad is capable of interacting with a capacitive screen, i.e. providing the screen can detect it making contact therewith.

It can also be understood that the body enables the prehension of the manual device so as to be manipulated, in particular for interacting with the capacitive screen. The body extends longitudinally in a longitudinal direction or length direction. The extent of the body in the longitudinal direction is considered below as being the length of the body. The body is preferably rectilinear. The rod also extends along the longitudinal direction, inside the body. The body is therefore hollow so as to be able to receive the rod. The rod and the body are substantially parallel. In a variant, the rod and the body are coaxial. This makes it possible to obtain a structure that is simple to fabricate.

The rod may be solid or hollow. The rod may also be substantially in the form of a cylinder of circular, elliptical, polygonal, etc. section. The length and the shape of the rod are not limited. For example, the rod could extend over the entire length of the body, or over only a fraction of the length that is shorter than the length of the body. The size of the rod in the longitudinal direction is considered below as being the length of the rod.

The rod is made of polymer material, i.e. a material based on one or more polymers. In a variant, the polymer material is filled with at least one conductive material. In another variant, the polymer material is coated at least in part with a conductive coating. In yet another embodiment, the material of the rod is filled with conductive material and is coated with a conductive coating. In other words, the rod is made out of a polymer material and includes in its bulk a filler of at least one conductive material, or presents on its surface a conductive coating, or indeed it has both a filler and a coating.

By way of example, the polymer material is a thermoplastic. For example, the polymer material may comprise one or more compounds selected from: acrylonitrile butadiene styrene (also known under the acronym ABS); acrylonitrile methyl methacrylate (also known under the acronym AMMA); acrylonitrile styrene acrylate (also known under the acronym ASA); cellulose acetate (also known under the acronym CA); cellulose acetobutyrate (also known under the acronym CAB); cellulose acetopropionate (also known under the acronym CAP); expanded polystyrene (also known under the acronym EPS); ethylene tetrafluoroethylene (also known under the acronym ETFE); ethylene-vinyl alcohol (also known under the acronym EVAL or EVOH); perfluoro ethylene propylene (also known under the acronym FEP or PFEP); methylmethacrylate-butadiene-styrene (also known under the acronym MBS); methylcellulose (also known under the acronym MC); polyamide (also known under the acronym PA); polycaprolactam (also known under the acronym PA6); polyamide-imide (also known under the acronym PAI); polyacrylonitrile (also known under the acronym PAN); polybutene-1 (also known under the acronym PB-1); polybutylene terephthalate or poly(butylene terephthalate) (also known under the acronym PBT); polycarbonate (also known under the acronym PC); polychlorotrifluoroethylene (also known under the acronym PCTFE); polyethylene (also known under the acronym PE); high density polyethylene (also known under the acronym PE-HD); low density polyethylene (also known under the acronym PE-LD); linear low density polyethylene (also known under the acronym PE-LLD); ultra-high molar weight polyethylene (also known under the acronym PE-UHMW); polyether block amide copolymer (also known under the acronym PEBA); polyestercarbonate (also known under she acronym PEC); polyetheretherketone (also known under the acronym PEEK); polyetherimide (also known under the acronym PEI); polyetherketone (also known under the acronym PEK); poly(ethylene naphthalate) (also known under the acronym PEN); polyethersulfone (also known under the acronym PESU); poly(ethylene terephthalate) (also known under the acronym PET); perfluoroalkoxy (also known under the acronym PFA); polyketone (also known under the acronym PK); polymethyl methacrylate (also known under the acronym PMMA); polymethylpentene (also known under the acronym PMP); polyoxymethylene or polyacetal or polyformaldehyde (also known under the acronym POM); polypropylene or polypropene (also known under the acronym PPE); poly(phenylene ether) (also known under the acronym PPE); poly(phenylene oxide) (also known under the acronym PPO); poly(propylene oxide) (also known under the acronym PPOX); poly(phenylene sulfide) (also known under the acronym PPS); polystyrene (also known under the acronym PS); polysulfone (also known under the acronym PSU); polytetrafluoroethylene (also known under the acronym PTFE); polyurethane (also known under she acronym PUR); poly(vinyl acetate) (also known under the acronym PVAC); poly(vinyl alcohol) (also known under the acronym PVAL); polyvinyl chloride (also known under the acronym PVC); polyvinylidene fluoride (also known under the acronym PVDF); poly(vinyl fluoride) (also known under the acronym PVF); styrene-acrylonitrile (also known under the acronym SAN); silicone (also known under the acronym SI); styrene maleic anhydride (also known under the acronym SSMA or SMAnh); polyolefine; and polyester. More generally, the polymer material is a synthetic organic polymer material or a synthetic organic polymer. Such materials are particularly well adapted to fabricating the rod on an industrial scale.

A filler is an additive material, introduced into the polymer material during fabrication of the rod. Thus, a polymer material filled with at least one conductive material is a polymer material into the bulk of which at least one conductive material is introduced during fabrication of the rod. Because of this conductive material filler, the rod presents conductive properties. For example, the polymer material may be filled with at least 2% by weight of conductive material.

For example, the conductive material filler comprises one or more compounds selected from carbon black, carbon nanotubes, or metal particles.

A conductive coating may for example be a deposited laminate, paint, or equivalent that presents conductive properties, or it may be a deposited foil of conductive material, e.g. a metal foil.

Thus, because of the conductive material filler and/or the conductive coating, the rod is conductive. The rod is electrically in contact with the pad, either directly or indirectly. For example, a rod having a tab touching the pad forms a rod that is directly connected to or in electrical contact with the pad. In another example, the rod is in contact with the pad via a conductive element that is distinct from the rod and from the pad, e.g. a metal wire, thus forming a rod that is indirectly connected to or in contact with the pad.

The inventors have found, surprisingly, that when the user handles the manual device by holding the prehension body via a region that longitudinally overlaps the rod, the surface of a capacitive screen is sensitive to the presence of the pad, preferably by making contact therewith, and that this is true even though there is no direct electrical contact between the hand and the rod, nor between the hand and the pad. It is widely accepted by the person skilled in the art that in order to enable a pad to interact with a capacitive screen, it is essential for there to be direct electrical contact between the pad and the user's hand. Naturally, the screen is not sensitive to the manual device if it is not being manipulated by a hand, or if the hand is not placed on a region that overlaps the rod.

Thus, by means of this surprising effect, it is possible to use any non-conductive prehension body and thus to avoid constraints of design, fabrication, and expense for conventional devices that make it possible to use capacitive screens.

Furthermore, a rod fabricated on the basis of a polymer material filled with or coated with a conductive material presents the advantage of being easy to work at a cost that is appropriate for large-scale industrial production. In addition, the material of the rod is compatible with the materials commonly in use for fabricating the body, thereby facilitating assembly of the rod within the body and enabling it to be adapted to the bodies of already-existing manual devices.

The term "longitudinal overlap" is used to mean that two elements are located in a common longitudinal region or in a common longitudinal position. In other words, when the user manipulates the manual device and places a hand in a longitudinal region of the body in which the rod extends, then a capacitive screen detects the presence of the pad when the pad is brought close to or into contact with the capacitive screen.

In other words, if the rod extends longitudinally over a small portion of the body, e.g. over 10% of the length of the body, the prehension portion of the prehension body occupying those 10% of the length of the body forms a prehension portion overlapping the rod. By manipulating the manual device using this prehension portion overlapping the rod, a capacitive screen detects the presence of the device when the pad is brought close to or into contact with the screen.

Advantageously, the rod extends over more than 10% of the length of the body.

This makes it possible to obtain a prehension portion that extends over at least 10% of the length of the body. The manual device is thus made to be more ergonomic.

Advantageously, the pad is mounted on the body via a conductive base, while the rod is electrically in contact with the pad via the base.

It can be understood that the base is an intermediate element arranged between the pad and the body. Such a base presents the advantage of making it easier to assemble the pad on the body. The base also facilitates making electrical contact between the rod and the pad when assembling the manual device.

Advantageously, the rod and the base form a single piece.

This makes it possible to reduce the number of parts within the manual device. This simplifies its structure and cost of fabrication. It can thus be understood that the base and the rod are made out of the same material, and form a one-piece part. Electrical conduction between the base and the rod is thus optimized.

Advantageously, the pad is mounted on the base directly (i.e. without any intermediate element). Thus, when the base and the rod form a single piece made out of the same material, it can be considered that the rod is directly in electrical contact with the pad, thereby improving the quality of electrical contact between them.

Advantageously, the device comprises a writing tip or the equivalent.

It can be understood that the longitudinal prehension body has two opposite ends, one end carrying the pad and the other end carrying the writing tip. For example, the writing tip or the equivalent is a ballpoint, a felt tip, a propelling pencil tip, a rigid tip for a resistive screen, the tip of a punch, or the endpiece of any other manual device.

Advantageously, the writing tip is fed from a reservoir, said reservoir being located in full or in part inside the rod.

It can be understood that in this configuration, the rod is hollow, and that the cavity formed inside the rod receives part or all of the reservoir for the tip. For example, the reservoir may be a reservoir of ballpoint ink, or of free ink, or it may be a fiber reservoir for a felt tip pen, or indeed a reservoir for a pencil lead.

By placing the rod around the reservoir, the overall size of the manual device is reduced, thereby improving its ergonomics. The weight of the rod is also reduced by using a rod that is hollow, which is advantageous from the point of view of ease and comfort in use.

Advantageously, the body is made of insulating polymer material, of wood, of ceramic, of glass, or the equivalent.

The term "equivalent" is used to mean any insulating material for forming a prehension body, e.g. Bakelite™, card, materials based on wood, on glass, or on ceramic, a composite material based on one or more of the above-mentioned materials, e.g. based on wood and on a polymer material, etc. For example, the polymer material is a thermoplastic, and more particularly comprises one or more compounds from the above-mentioned list of examples.

Advantageously, the body presents an outside surface (or wall) with a layer of conductive material being arranged on the outside surface of the body.

It can be understood that the layer of conductive material is insulated from the rod and from the pad. In other words, the layer of conductive material is not mechanically in contact with and is not electrically in contact with the pad and/or the conductive base and/or the rod. In general manner, it can be understood that by being insulated from the pad, the layer is not in contact with the pad, whether directly or indirectly, e.g. via the base, the rod, or some other element. The inventors have found, surprisingly, that such a conductive layer arranged on the outside surface of the body improves interactions between the manual device and a capacitive screen. In other words, a capacitive screen reacts more easily and/or detects more easily the presence of the pad of the manual device when the body presents this conductive layer.

Advantageously, layer extends at least in part in longitudinal overlap with the rod.

When the layer overlaps the rod longitudinally, interactions with a capacitive screen are still more easily detected by the screen.

Advantageously, the layer extends over at least 30% of the length of the rod.

Such longitudinal overlap makes it possible to ensure good interactions with a capacitive screen.

Advantageously, the layer comprises a metal foil or a conductive laminate, e.g. a metallic paint.

Such materials are easy to work, and present satisfactory performance.

Advantageously, the rod is spaced apart (or radially spaced apart) from the body. It can thus be understood that the rod does not make contact with the body, at any point. In other words, the rod is remote (or radially remote) from the body. It can thus be understood that a sheet of air lies between the rod and the body. This sheet of air is an additional insulating layer that enhances the capacitive effect of the manual device (between the user's fingers and the rod, or between the layer of conductive material and the rod).

Advantageously, the rod and the body are substantially cylindrical, the rod and the body each presenting an outside surface of substantially cylindrical shape, the radial distance between the outside surface of the rod and the outside surface of the body being less than 5 millimeters (mm). Such a distance makes it possible to obtain a good capacitive effect. It can be understood that a substantially cylindrical shape is, by way of example, a shape in which the section of its outside surface and the section of its inside surface are of different shapes, which shapes may be circular, elliptical, polygonal, etc. sections.

BRIEF DESCRIPTION OF THE DRAWINGS

The invention and its advantages can be better understood on reading the detailed description of various embodiments of the invention given as non-limiting examples. The description refers to the accompanying pages of figures, in which:

FIG. 1 shows a manual device in a first embodiment, seen in perspective;

FIG. 2 shows the FIG. 1 manual device, in an exploded view in perspective;

FIG. 3 shows the FIG. 1 manual device in section on plane III;

FIG. 4 shows a manual device in a second embodiment, seen in perspective; and

FIG. 5 shows the FIG. 4 manual device seen in section plane V.

DETAILED DESCRIPTION OF EMBODIMENTS

A first embodiment of a manual device 100 is described with reference to FIGS. 1 to 3.

The manual device 100 comprises a longitudinal prehension body 10, a pad 12 for a capacitive screen, and a rod 14 extending longitudinally inside the body 10. The manual device 100, and more particularly the body 10 and the rod 14 extend along the longitudinal direction X. Naturally, the body 10 is hollow so as to receive the rod 14. The body 10 is insulating, whereas the pad 12 and the rod 14 are conductive. The pad 12 and the rod 14 are electrically in contact.

The body 10 presents two ends 10a and 10b. The end 10a forms the rear end, or first end, of a pen, whereas the end 10b forms the front end or second end of a pen. In this example, with the exception of the front end 10b that is substantially frustoconical in shape, the body 10 is substantially cylindrical in shape, being of hexagonal section on the outside and of circular section on the inside.

The manual device 100 has a writing tip 16 mounted on the end 10b of the body 10, while the pad 12 is mounted on the end 10a. In this example, the manual device 100 thus forms a two-in-one device forming both a pen for writing and a stylus for a capacitive screen.

The pad 12 is mounted on she body 10 via a base 13. The base 13 is thus mounted on the body 10, and the pad 12 is mounted on the base 13. In this example, the pad 12 is electrically in contact with the rod 14 via the base 13.

The pad 12 presents a distal end 12a for co-operating with a capacitive screen, this end 12a in this example being substantially in the form of a hollow hemisphere. The end 12a extends a fastener portion 12b that is substantially in the form of a hollow cylinder. The fastener portion 12b has a collar 12c arranged in the vicinity of the free end of the fastener portion 12b, on the inside of the fastener portion 12b. The collar 12c co-operates by snap-fastening with an annular groove 15 formed in the base 13. A ring 20 is engaged by force around the fastener portion 12b and the base 13, and it is crimped on the base 13 (cf. FIG. 3). This ring 20 locks the snap-fastening between the pad 12 and the base 13. The base 13 presents a shoulder 13a receiving the ring 20 pressing thereagainst.

The base 13 presents a through hole 13b in the longitudinal direction X so as to form a vent for balancing the pressure inside the volume formed between the pad 12 and the base 13, and the pressure outside said volume.

The base 13 presents a shoulder 13 that co-operates with the body 10, e.g. by adhesive or welding (heat sealing, ultrasound welding, etc.). The base 13 and the rod 14 form a single part made of the same material. Thus, in this example, the rod 14 is fastened to the body 10 via the base 13. The connection region between the base 13 and the rod 14 presents extra thickness 13*d* for centering that co-operates by complementary shapes with a depression 10*c* formed in the rear end 10*a* of the body 10. Furthermore, when the base 13 is welded to the body 10, the extra thickness 13*d* also contributes to fastening the base 13 on the body 10. Since the extra thickness 13*d* is in privileged contact with the body, it forms a bead of welding. In this example, the extra thickness 13*d* and the depression 10*c* are substantially annular in shape.

The rod 14 is hollow. The vent 13*c* of the base 13 leads into the internal cavity of the hollow rod 14. The rod 14 extends inside the body 10 from the rear end 10*a*. As shown in FIG. 3, the rod 14 extends over more than 10% of the length of the body 10, where length is generally considered along the longitudinal direction X. In this example, the rod extends over about 50% of the body 10, starting from the rear end 10*a*. In other words, when considered along the longitudinal direction X, the rod 12 extends over about half of the body 10.

The writing tip 16, in this example a ballpoint, is fed with ink from a reservoir 18 containing ink 19. As shown in FIG. 3, the reservoir 18 extends in part inside the rod 14. More particularly, the rear end 18*a* of the reservoir 18, i.e. the end of the reservoir located remote from the writing tip 16, is arranged inside the rod 14. More generally, the ink reservoir extends longitudinally along the longitudinal direction X in full or in part inside the rod 14. In this example, a fraction of about 50% starting from the rear end 18*a* of the reservoir 18 is arranged inside the rod. In other words, in this example, when considered along the longitudinal direction X, approximately the rear half of the reservoir 18 is located inside the rod 14.

In this example, the outside diameter of the rod is 5.4 mm, while the inside diameter of the body is 5.52 mm. In general manner, it can be understood that the rod 14 is spaced apart from the body 10. The thickness of the body lies in the range 1.2 mm to 1.5 mm. Thus, the radial thickness between the outside surface (or wall) of the body and the outside surface (or wall) of the rod lies in the range 1.26 mm to 1.56 mm. More generally, the inventors have found that the manual device 100 operates in satisfactory manner when the radial distance between the outside surface of the body and the outside surface of the rod is less than 5 mm.

In this example, the body 10 is made of PS, the rod 12 and the base 13 are made of ABS containing a filler of 3% by weight of carbon nanotubes. The pad 14 is made of elastomer material containing conductive elements. In this example, the pad 14 is made of silicon filled with particles of carbon black. The ring 20 is made of chromium-plated copper.

Thus, because of the material used, the pad 12 is in indirect electrical contact with the rod 14 via the base 13. Since the ring 20 is made of metal, it also contributes to providing electrical contact between the base 13 and the pad 12, however its main function is to hold the pad 12 mechanically on the base 13.

When the user manipulates the manual device 100 by taking hold of a region of the body 10 that overlaps the rod 14 in the longitudinal direction X, a capacitive screen is sensitive to contact from the pad 12. In other words, when the user manipulates the manual device 100 and holds the device in a longitudinal region of the body 10 in which the rod 14 extends, a capacitive screen detects the presence of the pad 12 when the pad is brought close to or into contact with the capacitive screen. In FIG. 3, the region A of the body 10 forms the prehension region of the body 10 that overlaps the rod 14 longitudinally, while the region B of the body 10 forms a prehension region that does not overlap the rod 14 longitudinally.

A second embodiment of a manual device 200 is described below with reference to FIGS. 4 and 5. The only difference with the manual device 100 of the first embodiment is the presence of a layer of conductive material on the outside surface of the body. Thus, all of the elements that are common to the first and second embodiments are not described again, and they retain the same reference signs.

In the second embodiment, the body 10 presents a layer 202 of conductive material on its outside surface. In this example, the layer 202 comprises metal foil stuck onto the outside surface of the body 10 by conventional means, e.g. hot-melt adhesive. The metal foil is made of aluminum. As shown in FIG. 5, the layer 202 does not extend as far as the rear end 10*a* of the body. There is therefore no electrical contact between the layer 202 and the base 13, the ring 20, or the pad 12. In other words, the layer 202 is insulated from the base 13, the ring 20, and the pad 12 (and of course the rod 14).

This layer 202 extends over a region C longitudinally overlapping approximately the entire length of the rod 14. Furthermore, the layer 202 extends over a region D that does not overlap the rod. The region D forms a prehension region that is additional to the prehension region A. Thus, by means of the coating 202, the effective prehension region for using the pad 12 on a capacitive screen is increased, thereby making the manual device 200 more ergonomic than the manual device 100.

Although the present invention is described with reference to specific embodiments, it is clear that modifications and changes may be made to those embodiments without going beyond the general ambit of the invention as defined by the claims. In particular, individual characteristics of the various embodiments that are shown and/or described may be combined to make additional embodiments. Consequently, the description and the drawings should be considered in a sense that is illustrative rather than restrictive.

The invention claimed is:

1. A manual device comprising:
   a longitudinal prehension body and a pad for a capacitive screen mounted on one end of the body, wherein the body is insulating, while the pad is conductive,
   a rod that comprises material selected from the group consisting of a polymer material that is filled with at least one conductive material, a polymer material that comprises a conductive coating, and any combination thereof, the rod being electrically in contact with the pad and extends longitudinally inside the body, and
   wherein the body has an outside surface with a layer of conductive material being arranged on the outside surface, the layer being insulated from the pad, said layer of conductive material being only on a part of an outside surface of said longitudinal prehension body.

2. A device according to claim 1, wherein the rod extends over more than 10% of the length of the body.

3. A device according to claim 1, wherein the pad is mounted on the body via a conductive base, while the rod is electrically in contact with the pad via the base.

4. A device according to claim 3, wherein the rod and the base form a single piece.

5. A device according to claim 1, further comprising a writing tip or the equivalent.

6. A device according to claim 1, wherein the body is made of: insulating polymer material, wood, ceramic, glass, or their equivalents.

7. A device according to claim 1, wherein the layer extends at least in part in longitudinal overlap with the rod.

8. A device according to claim 1, wherein the layer extends over at least 30% of the length of the rod.

9. A device according to claim 1, wherein the layer comprises a metal foil or a conductive laminate.

10. A device according to claim 1, wherein the rod is spaced apart from the body.

11. A device according to claim 1, wherein the rod and the body are substantially cylindrical, the rod and the body each having an outside surface of a substantially cylindrical shape, the radial distance between the outside surface of the rod and the outside surface of the body being less than 5 mm.

12. A device according to claim 1, the device being of the passive type.

13. A manual device comprising:
a longitudinal prehension body and a pad for a capacitive screen mounted on one end of the body, wherein the body is insulating, while the pad is conductive,
a rod that comprises material selected from the group consisting of a polymer material that is filled with at least one conductive material, a polymer material that comprises a conductive coating, and any combination thereof, the rod being electrically in contact with the pad and extends longitudinally inside the body, and
a writing tip or the equivalent,
wherein the body has an outside surface with a layer of conductive material being arranged on the outside surface, the layer being insulated from the pad, wherein the writing tip is fed from a reservoir, said reservoir being located in full or in part inside the rod.

14. A manual device comprising:
a longitudinal prehension body and a pad for a capacitive screen mounted on one end of the body, wherein the body is insulating, while the pad is conductive,
a rod that comprises material selected from the group consisting of a polymer material that is filled with at least one conductive material, a polymer material that comprises a conductive coating, and any combination thereof, the rod being electrically in contact with the pad and extends longitudinally inside the body, said rod being a hollow cylinder, and
wherein the body has an outside surface with a layer of conductive material being arranged on the outside surface, the layer being insulated from the pad.

* * * * *